(12) United States Patent
He et al.

(10) Patent No.: US 12,379,472 B2
(45) Date of Patent: Aug. 5, 2025

(54) PHOTOELECTRIC SENSOR CONTROLLED BY PULSE-FREQUENCY MODULATION

(71) Applicant: Apex Brands, Inc., Apex, NC (US)

(72) Inventors: Jiangming He, Shanghai (CN); Bin Sun, Shanghai (CN); Mingshuai Wang, Shanghai (CN); Henglian Luo, Shanghai (CN); Jingru Wang, Suzhou (CN)

(73) Assignee: APEX BRANDS, INC., Apex, NC (US)

( * ) Notice: Subject to any disclaimer, the term of this patent is extended or adjusted under 35 U.S.C. 154(b) by 0 days.

(21) Appl. No.: 18/846,059

(22) PCT Filed: Apr. 15, 2022

(86) PCT No.: PCT/CN2022/087039
§ 371 (c)(1),
(2) Date: Sep. 11, 2024

(87) PCT Pub. No.: WO2023/197291
PCT Pub. Date: Sep. 19, 2023

(65) Prior Publication Data
US 2025/0110217 A1  Apr. 3, 2025

(51) Int. Cl.
*G01S 7/484* (2006.01)
*B25H 3/02* (2006.01)
(Continued)

(52) U.S. Cl.
CPC .............. *G01S 7/484* (2013.01); *B25H 3/028* (2013.01); *G01S 7/497* (2013.01); *G01S 17/04* (2020.01)

(58) Field of Classification Search
CPC .......... G01S 7/484; G01S 7/497; G01S 17/04; B25H 3/028
See application file for complete search history.

(56) References Cited

U.S. PATENT DOCUMENTS 6,657,808 B1 * 12/2003 Sugano ................. G11B 15/08
  360/74.6
8,248,615 B2 * 8/2012 Ueno ...................... G01S 17/32
  356/498

(Continued)

FOREIGN PATENT DOCUMENTS

CN         105096212 A       11/2015
CN         208614743 U   *    3/2019
(Continued)

OTHER PUBLICATIONS

International Search Report and Written Opinion of corresponding International Application No. PCT/CN2022/087039, mailed on Jan. 9, 2023, all enclosed pages cited herein.

*Primary Examiner* — Andrew Roersma
(74) *Attorney, Agent, or Firm* — BURR & FORMAN LLP (57) ABSTRACT

A tool storage system is provided that includes a drawer, and an optical system configured to detect presence of an object in the drawer. The optical system includes a photoelectric sensor and processing circuitry. The photoelectric sensor includes a light transmitter configured to emit pulsed light, and a photoelectric receiver configured to convert a reflection of the pulsed light off of the object to an electrical signal that indicates proximity of the object and thereby the presence of the object in the drawer. The processing circuitry is configured to output a pulse-frequency modulation (PFM) signal from which the light transmitter is driven to emit the pulsed light. The PFM signal has a frequency that is adjustable to control an average intensity of the pulsed light, the frequency calibrated for a type of the object and an effective range of the photoelectric sensor.

20 Claims, 9 Drawing Sheets

(51) Int. Cl.
*G01S 7/497* (2006.01)
*G01S 17/04* (2020.01)

(56) References Cited

U.S. PATENT DOCUMENTS

| | | | |
|---|---|---|---|
| 11,293,630 B2 * | 4/2022 | Paul | G07C 9/00912 |
| 2003/0127586 A1 * | 7/2003 | Maruyama | G01S 17/04 |
| | | | 250/221 |
| 2014/0071432 A1 * | 3/2014 | Dunne | G01S 7/497 |
| | | | 356/5.01 |

FOREIGN PATENT DOCUMENTS

| | | | | |
|---|---|---|---|---|
| CN | 111812739 A | | 10/2020 | |
| CN | 113359581 A | | 9/2021 | |
| JP | 2010071926 A | | 4/2010 | |
| JP | 2010195466 A * | | 9/2010 | B25H 3/028 |
| WO | WO-2016023081 A1 * | | 2/2016 | B25H 3/00 |
| WO | WO-2022250766 A1 * | | 12/2022 | G01S 17/42 |
| WO | WO-2023114585 A1 * | | 6/2023 | G01S 17/34 |
| WO | WO-2023197289 A1 * | | 10/2023 | B25H 3/00 |

\* cited by examiner

PHOTOELECTRIC SENSOR CONTROLLED BY PULSE-FREQUENCY MODULATION

TECHNOLOGICAL FIELD

The present disclosure relates generally to photoelectric sensors and, in particular, to a photoelectric sensor driven by pulse-frequency modulation.

BACKGROUND

Photoelectric sensors are used in a number of applications to determine or otherwise detect presence, absence, proximity or distance of an object. A typical photoelectric sensor includes a light transmitter to emit light, and a photoelectric receiver to receive light. In some arrangements, the light transmitter and photoelectric receiver cooperate to detect a reflection of the emitted light off of an object, which is received by the photoelectric receiver. The ability of the photoelectric sensor to accurately detect the presence, absence, proximity or distance of the object may depend on the type of object. In this regard, the photoelectric sensor may be more or less able to detect objects of different types with different dimensions and reflectivity.

It would therefore be desirable to have a system and method that takes into account at least some of the issues discussed above, as well as other possible issues.

BRIEF SUMMARY

Example implementations of the present disclosure are directed to photoelectric sensors and, in particular, to a photoelectric sensor driven by pulse-frequency modulation. The photoelectric sensor of example implementations may be implemented in a number of different applications, such as in a tool storage system to detect the presence of objects such as tool stored in the tool storage system. The present disclosure includes, without limitation, the following example implementations.

Some example implementations provide a tool storage system comprising: a cabinet; a drawer operably coupled to the cabinet; and an optical system configured to detect presence of an object in the drawer, the optical system comprising: a photoelectric sensor including a light transmitter configured to emit pulsed light, and a photoelectric receiver configured to receive a reflection of the pulsed light off of the object in proximity of the photoelectric sensor, and convert the reflection of the pulsed light to an electrical signal that indicates the proximity of the object and thereby the presence of the object in the drawer; and processing circuitry operably coupled to the photoelectric sensor, the processing circuitry configured to output a pulse-frequency modulation (PFM) signal from which the light transmitter is driven to emit the pulsed light, the PFM signal having a frequency that is adjustable to control an average intensity of the pulsed light, the frequency and thereby the average intensity of the pulsed light calibrated for a type of the object and an effective range of the photoelectric sensor.

Some example implementations provide an optical system comprising: a photoelectric sensor including: a light transmitter configured to emit pulsed light; and a photoelectric receiver configured to receive a reflection of the pulsed light off of an object in proximity of the photoelectric sensor, and convert the reflection of the pulsed light to an electrical signal that indicates the proximity of the object; and processing circuitry operably coupled to the photoelectric sensor, the processing circuitry configured to output a pulse-frequency modulation (PFM) signal from which the light transmitter is driven to emit the pulsed light, the PFM signal having a frequency that is adjustable to control an average intensity of the pulsed light, the frequency and thereby the average intensity of the pulsed light calibrated for a type of the object and an effective range of the photoelectric sensor.

Some example implementations provide a method of detecting an object in proximity of a photoelectric sensor that includes a light transmitter and a photoelectric receiver, the method comprising: emitting pulsed light from the light transmitter; receiving, at the photoelectric receiver, a reflection of the pulsed light off of the object in proximity of the photoelectric sensor; converting, at the photoelectric receiver, the reflection of the pulsed light to an electrical signal that indicates the proximity of the object; and outputting a pulse-frequency modulation (PFM) signal from which the light transmitter is driven to emit the pulsed light, the PFM signal having a frequency that is adjustable to control an average intensity of the pulsed light, the frequency and thereby the average intensity of the pulsed light calibrated for a type of the object and an effective range of the photoelectric sensor.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure relate generally to photoelectric sensors and, in particular, to a photoelectric sensor driven by pulse-frequency modulation. The photoelectric sensor of example implementations is generally configured to determine or otherwise detect presence, absence, proximity or distance of an object. The photoelectric sensor is primarily described in in a proximity-sensing (diffused) arrangement. It should be understood, however, that the photoelectric sensor may be equally implemented in other arrangements including an opposed (through-beam) or retro-reflective arrangement.

The photoelectric sensor of example implementations may be implemented in a number of different applications. In some particular useful applications, the photoelectric sensor may be implemented in a tool storage system to detect the presence of objects such as tool stored in the tool storage system.

Figure 1A:
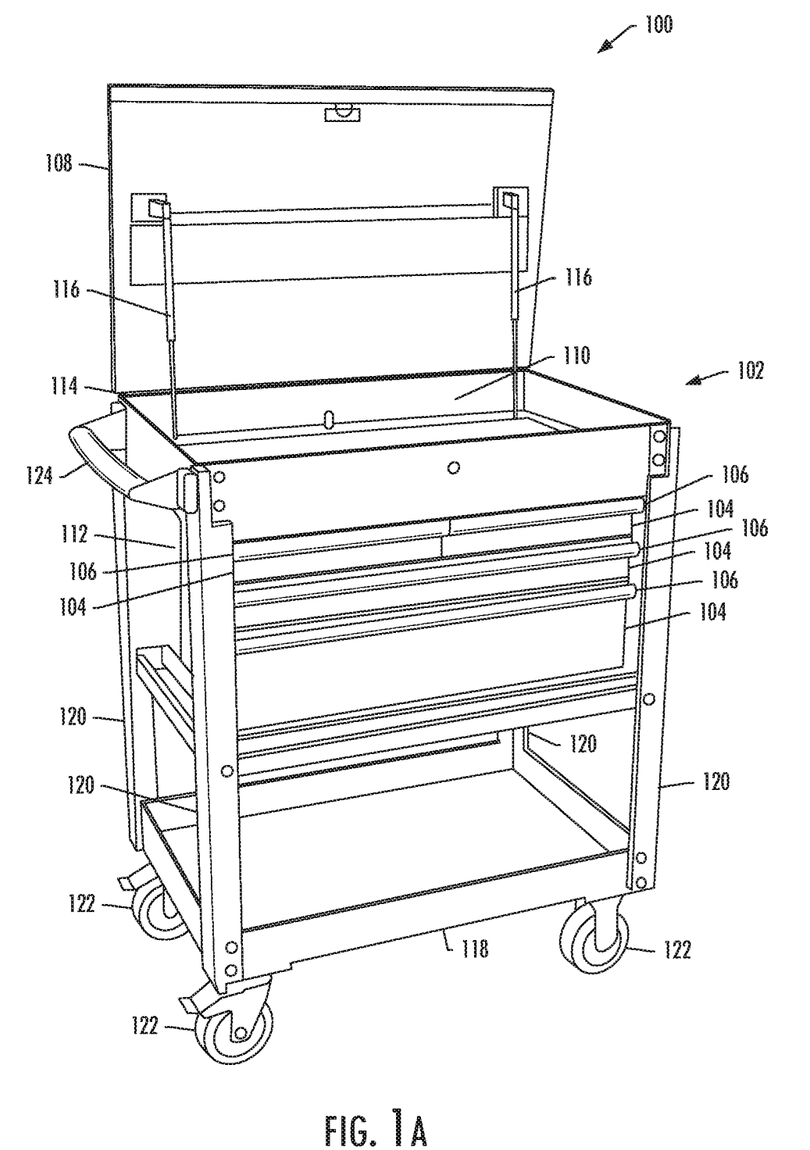
FIGS. 1A and 1B illustrate a tool storage system that may benefit from a photoelectric sensor, according to some example implementations of the present disclosure.
Figure 1B:
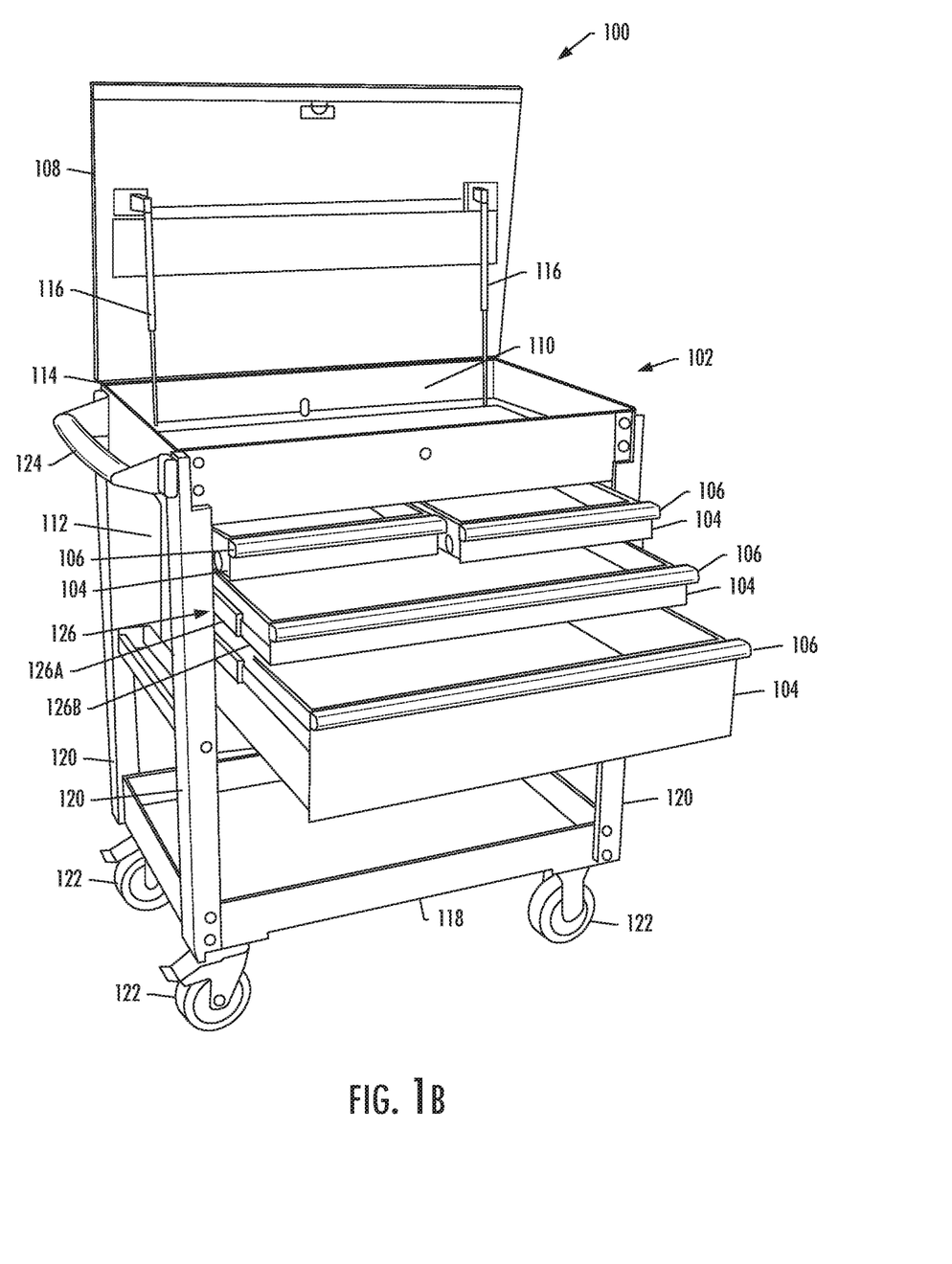

FIGS. 1A and 1B illustrate a tool storage system 100 that may benefit from a photoelectric sensor, according to some example implementations of the present disclosure. As shown, the tool storage system includes a cabinet 102 with one or more drawers 104 (four drawers shown), and the tool storage system may include drawer handles 106 that allow the drawers to be opened and closed. FIG. 1A illustrates the tool storage system with the drawers closed, and FIG. 1B illustrates the tool storage system with the drawers open. In the illustrated example, the tool storage system is embodied as a utility cart. It should be understood, however, that the tool storage system may be embodied in a number of different manners. In other example implementations, the tool storage system may be embodied as a toolbox, a tool chest, a rolling tool cabinet or the like.

As a utility cart, the tool storage system 100 may include a lid 108 that may be operably coupled to a cabinet back panel 110 (e.g., extending between cabinet side panels 112) via a hinge assembly 114 disposed at the intersection of the cabinet back panel and the lid. In some examples, the tool storage system includes one or more struts 116 to support opening and closing of the lid. The tool storage system may include a bottom tray 118 and posts 120 that support the cabinet 102 above the bottom tray. The tool storage system may include casters 122 or other wheels attached under the bottom tray to enable the tool storage system to be moved, and a side handle 124 may be attached to the cabinet to enable a user to control movement of the tool storage system.

As shown more particularly in FIG. 1B, in some examples, the tool storage system 100 includes drawer slides 126 by which the drawers 104 are operably coupled to the cabinet 102, and that allow the drawers to open and close. The drawer slides may include cabinet members 126A affixed to the cabinet, and drawer members 126B affixed to the drawers, and the drawer members may be slidably engaged with the cabinet members enable the drawer to slidably open and close.

Figure 2:
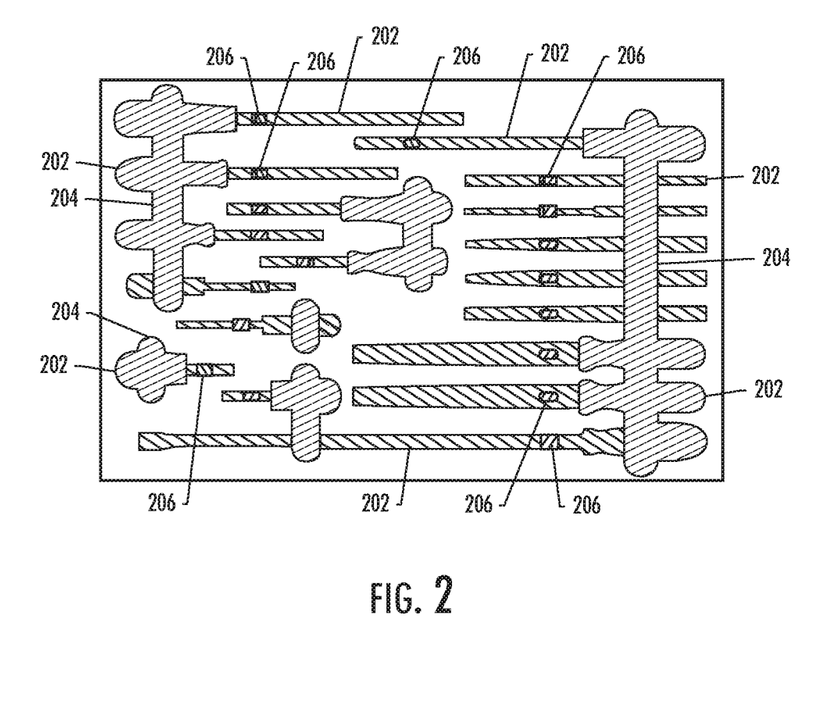
FIG. 2 illustrates an optical system including a photoelectric sensor, according to some example implementations.

FIG. 2 illustrates a drawer insert 200 that may be sized to fit within a drawer 104 of the tool storage system 100, according to some example implementations of the present disclosure. The drawer insert may be constructed of a number of different materials including foam material such as ethylene-vinyl acetate (EVA), polyurethane (PU) or the like. The drawer insert defines a number of tool-shaped spaces 202 in which tools may be inserted and held in place by the drawer insert, and a number of finger pockets 204 that facilitate removal of the tools from the drawer insert. The drawer insert may further include a number of photoelectric sensors 206 embedded within the tool-shaped spaces, and configured to detect presence (or absence) of tools within respective ones of the tool-shaped spaces.

Figure 3:
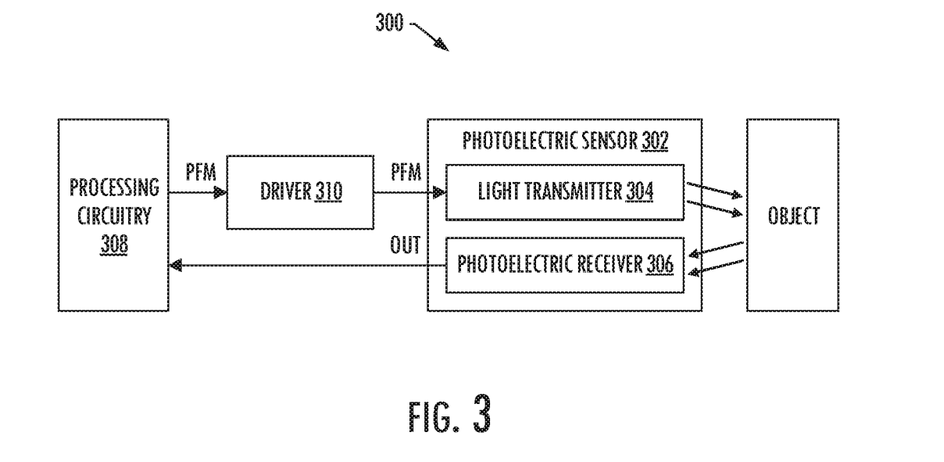
FIG. 3 illustrates a drawer insert tray for a tool storage system that may include the optical system, according to some example implementations.

FIG. 3 illustrates an optical system 300 including a photoelectric sensor 302 that may correspond to photoelectric sensor 206, according to various example implementations of the present disclosure. As shown, the photoelectric sensor includes a light transmitter 304 and a photoelectric receiver 306. The light transmitter is configured to emit pulsed light. The photoelectric receiver is configured to receive a reflection of the pulsed light off of an object in proximity of the photoelectric sensor, and convert the reflection of the pulsed light to an electrical signal that indicates the proximity of the object. One example of a suitable photoelectric sensor is an infrared (IR) photoelectric sensor that includes an IR transmitter and an IR receiver; and a particular type of light transmitter is a light emitting diode (LED) such as an IR LED. The photoelectric receiver in various examples includes a phototransistor configured to cause the photoelectric receiver to produce the electrical signal. In some of these examples, the electrical signal is produced as a logic signal that switches between a first value and a second value that indicate respectively absence and presence of the object in proximity of the photoelectric sensor.

The optical system 300 also includes processing circuitry 308 operably coupled to the photoelectric sensor 302. The processing circuitry is configured to output a pulse-frequency modulation (PFM) signal from which the light transmitter 304 is driven to emit the pulsed light. In some examples, the optical system further includes a driver circuit 310 configured to receive the PFM signal, and switch the light transmitter 304 on and off consistent with the PFM signal to thereby emit the pulsed light. The PFM signal has a frequency that is adjustable to control an average intensity of the pulsed light, and the frequency and thereby the average intensity of the pulsed light are calibrated for a type of the object and an effective range of the photoelectric sensor.

In some examples, calibration of the frequency of the PFM signal includes the processing circuitry 308 configured to determine a first frequency and a second frequency, calculate the frequency of the PFM signal from the first frequency and the second frequency, and set the frequency of the PFM signal as calculated. In some of these examples, the first frequency represents a first extremum frequency for a first scenario in which the object is absent, and the second frequency represents a second extremum frequency for a second scenario in which the object is present.

In some examples, photoelectric receiver 306 is tuned to a particular center frequency (e.g., 38 kHz) of a band pass of the photoelectric receiver. The PFM signal, then, may be calculated in a lower frequency range below the particular center frequency, or an upper frequency range above the particular center frequency. For the lower frequency range, the first frequency represents a maximum frequency for the first scenario; and the second frequency is less than the first frequency, and represents a minimum frequency for the second scenario. For the upper frequency range, the first frequency represents a minimum frequency for the first scenario; and the second frequency is greater than the first frequency, and represents a minimum frequency for the second scenario.

The frequency may be calculated in a number of different manners, such as by a weighted value of the first frequency and the second frequency. In a more particular example, the frequency may be calculated as an average of the first frequency and the second frequency. In another example, the frequency may be calculated as $k \times freq_1 + (1-k) \times freq_2$, for some weighting value $k<1$. In the preceding, $freq_1$ represents the first frequency, and $freq_2$ represents the second frequency.

In some examples in which the electrical signal is produced as a logic signal that switches between the first value and the second value that indicate respectively absence and presence of the object, the processing circuitry 308 may set the frequency of the PFM signal to an initial value in a first setup of the optical system 300 in the first scenario in which the object is absent, and the logic signal has the first value. The processing circuitry may increment or decrement a value of the frequency from the initial value until an earlier of the value reaches a preset extremum value, or the logic signal changes from the first value to the second value. The processing circuitry may then record the value of the frequency as the first frequency.

For the lower frequency range, the preset extremum value is a preset maximum value, and the processing circuitry may increment the value of the frequency until the earlier of the value reaches the preset maximum value, or the logic signal changes from the first value to the second value. Likewise, for the upper frequency range, the preset extremum value is a preset minimum value, and the processing circuitry may decrement the value of the frequency.

Similarly, in some examples, the processing circuitry 308 may set the frequency of the PFM signal to an initial value in a second setup of the optical system in the second scenario in which the object is present, and the logic signal has the first value. The processing circuitry may increment (for the lower frequency range) or decrement (for the upper frequency range) a value of the frequency from the initial value until the logic signal changes from the first value to the second value. And thereafter, the processing circuitry may record the value of the frequency as the second frequency.

Figure 4A:
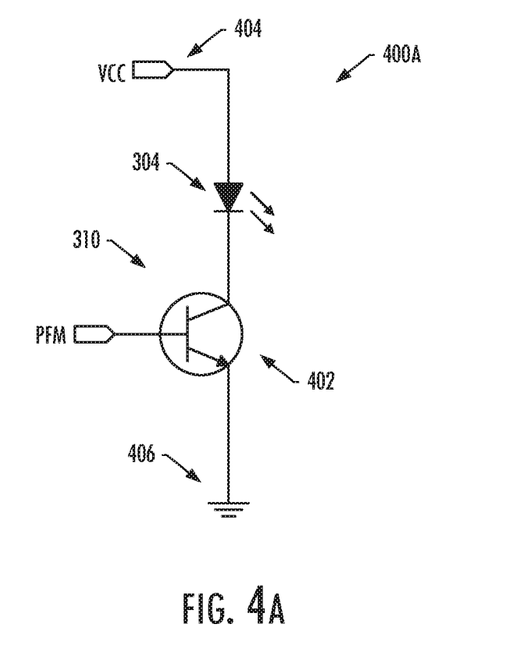
FIGS. 4A and 4B illustrate circuitry including a light transmitter of a photoelectric sensor, according to various example implementations.
Figure 4B:
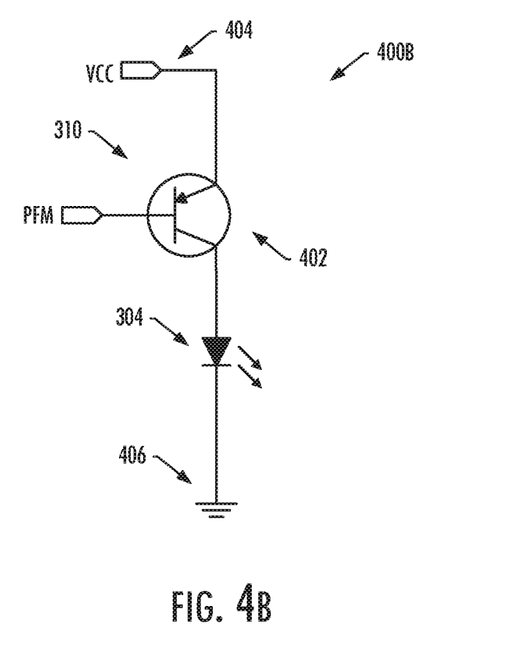

FIGS. 4A and 4B illustrate circuity 400A, 400B including the light transmitter 304 implemented as an IR LED, and in which the driver circuit 310 includes a transistor 402, according to various example implementations. As shown in FIG. 4A, the transistor is connected to the light transmitter as a low-side switch. In this regard, the light transmitter is connected to and between rail voltage 404 and the transistor, and the transistor connected to and between the light transmitter and ground 406. In FIG. 4B, the transistor is connected to the light transmitter as a high-side switch. In this arrangement, the transistor is connected to and between rail voltage and the light transmitter, and the light transmitter connected to and between the transistor and ground.

Figure 5A:
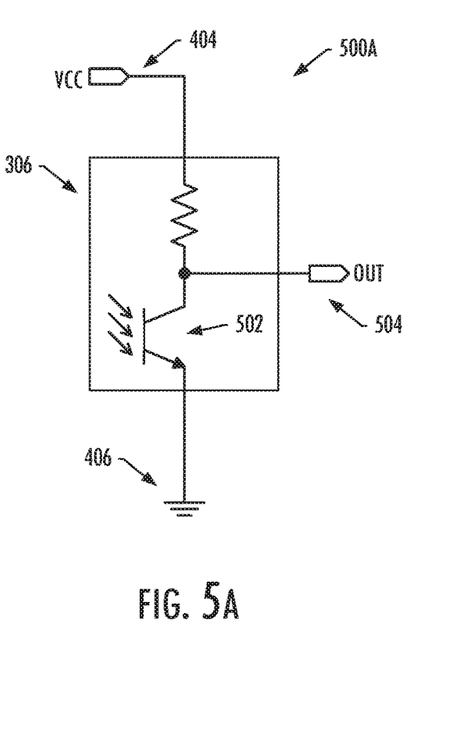
FIGS. 5A and 5B illustrate circuitry including a photoelectric receiver of a photoelectric sensor, according to various example implementations.
Figure 5B:
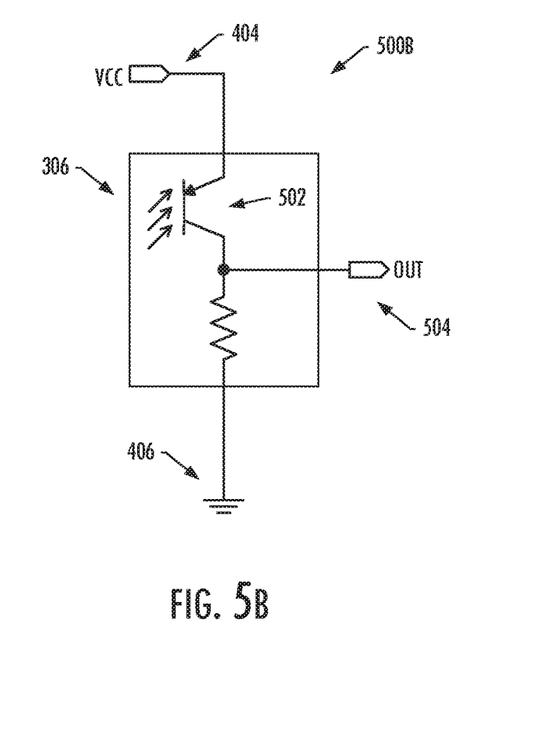

FIGS. 5A and 5B illustrate circuity 500A, 500B including the photoelectric receiver 306 with a phototransistor 502, according to various example implementations. As shown in FIG. 5A, the phototransistor is connected in the optical system as a low-side switch that causes the photoelectric receiver to produce the electrical signal as a waveform that switches between a high voltage level and a low voltage level that represent respectively the first value and the second value. In particular, the photoelectric receiver includes an output 504 to which the logic signal is provided. The output is connected to and between rail voltage 404 and the phototransistor, and the phototransistor connected to and between the output and ground 406.

FIG. 5B illustrates the phototransistor 502 connected in the optical system as a high-side switch that causes the photoelectric receiver to produce the electrical signal as a waveform that switches between a high voltage level and a low voltage level that represent respectively the second value and the first value. As shown, in FIG. 5B, the phototransistor is connected to and between rail voltage 404 and the output 504 to which the logic signal is provided, and the output is connected to and between the phototransistor and ground 406.

Figure 6:
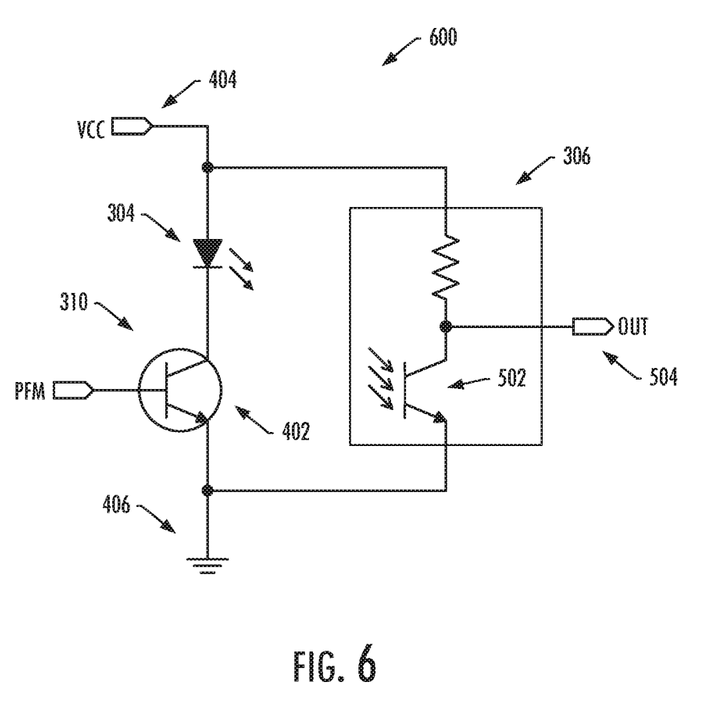
FIG. 6 illustrates circuitry including a light transmitter and a photoelectric receiver of a photoelectric sensor, according to some example implementations.

The circuitry 400A, 400B including the light transmitter 304, and the circuity 500A, 500B including the photoelectric receiver 306, may be connected in the optical system in a number of different manners. FIG. 6 illustrates a circuit 600 including the light transmitter 304 implemented as an IR LED, in which the driver circuit 310 includes a transistor 402, and including the photoelectric receiver 306 with a phototransistor 502, according to some examples. In FIG. 6, the transistor is connected to the light transmitter as a low-side switch, as described in greater detail above with respect to FIG. 4A, and the phototransistor is connected in the optical system as a low-side switch, as described in greater detail above with respect to FIG. 5A.

FIGS. 7A-7F are flowcharts illustrating various steps in a method 700 of detecting an object in proximity of a photoelectric sensor that includes a light transmitter and a photoelectric receiver, according to various example implementations of the present disclosure. The method includes emitting pulsed light from the light transmitter, as shown at block 702 of FIG. 7A. The method includes receiving, at the photoelectric receiver, a reflection of the pulsed light off of the object in proximity of the photoelectric sensor, as shown at block 704. The method includes converting, at the photoelectric receiver, the reflection of the pulsed light to an electrical signal that indicates the proximity of the object, as shown at block 706. And the method includes outputting a pulse-frequency modulation (PFM) signal from which the light transmitter is driven to emit the pulsed light, the PFM signal having a frequency that is adjustable to control an average intensity of the pulsed light, the frequency and thereby the average intensity of the pulsed light calibrated for a type of the object and an effective range of the photoelectric sensor, as shown at block 708.

Figure 7A:
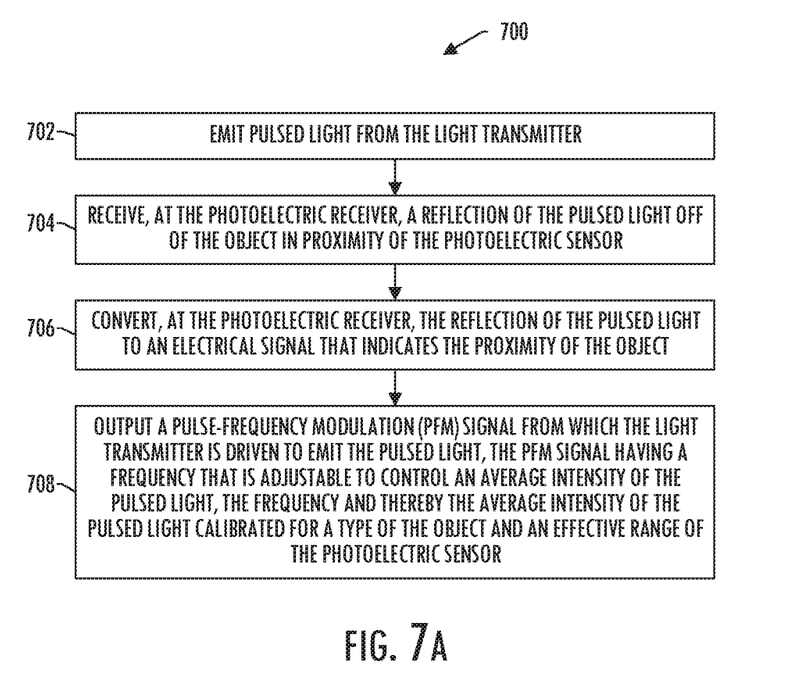
FIGS. 7A, 7B, 7C, 7D, 7E and 7F are flowcharts illustrating various steps in a method of detecting an object in proximity of a photoelectric sensor, according to various example implementations, according to example implementations.
Figure 7B:
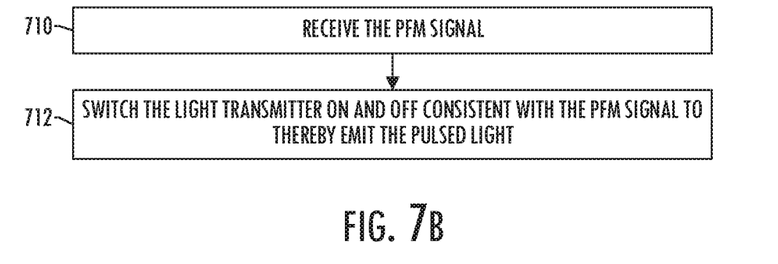

In some examples, the method 700 further includes a driver circuit receiving the PFM signal, and switching the light transmitter on and off consistent with the PFM signal to thereby emit the pulsed light, as shown at blocks 710 and 712 of FIG. 7B. In some further examples, the driver circuit includes a transistor that switches the light transmitter as a low-side switch at block 712. In some of these examples, the light transmitter is connected to and between rail voltage and the transistor, and the transistor connected to and between the light transmitter and ground. In some other further examples, the driver circuit includes a transistor that switches the light transmitter as a high-side switch at block 712. In some of these examples, the transistor is connected to and between rail voltage and the light transmitter, and the light transmitter connected to and between the transistor and ground.

In some examples, the photoelectric receiver includes a phototransistor that causes the photoelectric receiver to produce the electrical signal as a logic signal that switches between a first value and a second value that indicate respectively absence and presence of the object in proximity of the photoelectric sensor.

In some further examples, the phototransistor is connected in the optical system as a low-side switch that causes the photoelectric receiver to produce the electrical signal as a waveform that switches between a high voltage level and a low voltage level that represent respectively the first value and the second value. In some yet further examples, the photoelectric receiver includes an output to which the logic signal is provided, the output connected to and between rail voltage and the phototransistor, and the phototransistor connected to and between the output and ground.

In some examples, the phototransistor is connected in the optical system as a high-side switch that causes the photoelectric receiver to produce the electrical signal as a waveform that switches between a high voltage level and a low voltage level that represent respectively the second value and the first value. In some further examples, the photoelectric receiver includes an output to which the logic signal is provided, the phototransistor connected to and between rail voltage and the output, and the output connected to and between the phototransistor and ground.

Figure 7C:
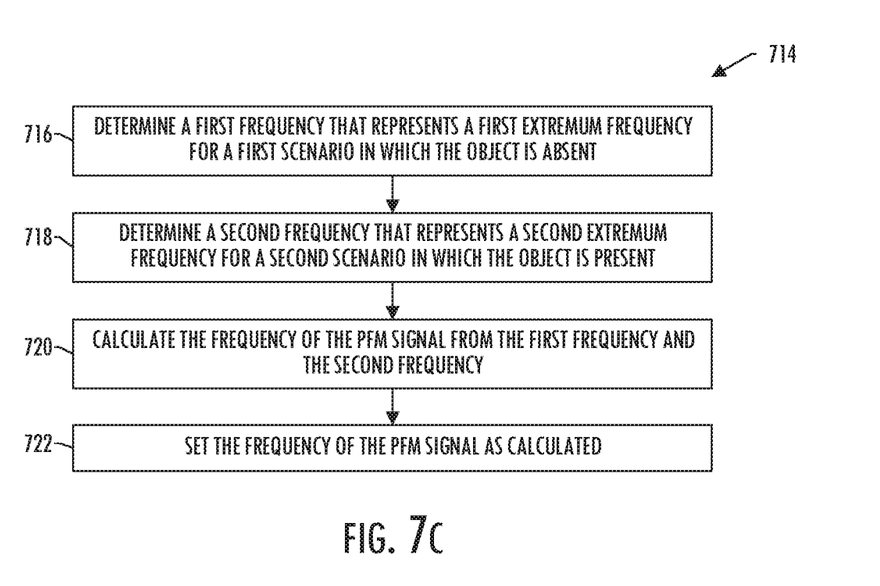
Figure 7D:
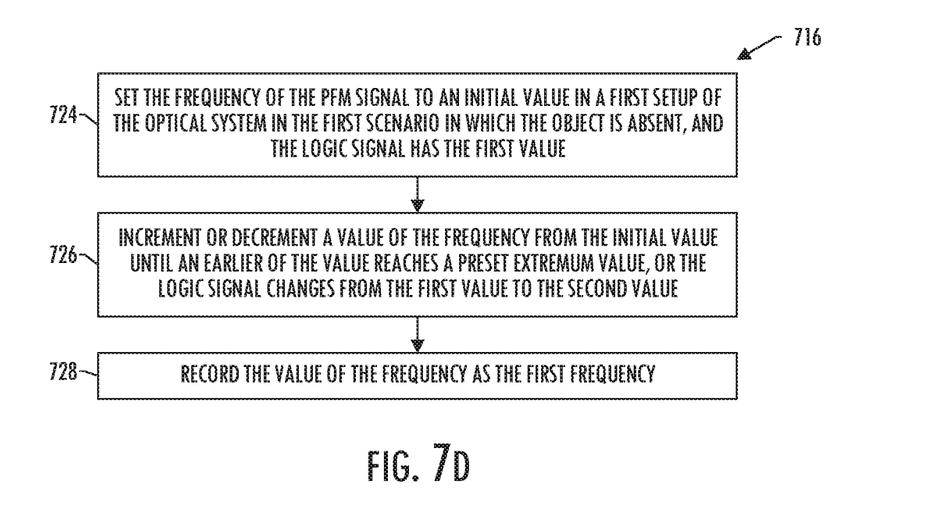

In some examples, the method 700 further includes calibrating the frequency of the PFM signal, as shown at 714 of FIG. 7C. As shown, this includes determining a first frequency that represents a first extremum frequency for a first scenario in which the object is absent, as shown at block 716. It also includes determining a second frequency that represents a second extremum frequency for a second scenario in which the object is present, as shown at block 718. The frequency of the PFM signal is then calculated from the first frequency and the second frequency, as shown at block 720. And the frequency of the PFM signal is set as calculated, as shown at block 722.

In some examples, the first extremum frequency is a maximum frequency for the first scenario; and in some of these examples, the second frequency is less than the first frequency, and represents the second extremum frequency that is a minimum frequency for the second scenario.

In some examples, the first extremum frequency is a minimum frequency for the first scenario; and in some of these examples, the second frequency is greater than the first frequency, and represents the second extremum frequency that is a maximum frequency for the second scenario.

In some examples, the photoelectric receiver is configured to produce the electrical signal as a logic signal that switches between a first value and a second value that indicate respectively absence and presence of the object in proximity of the photoelectric sensor. In some of these examples, determining the first frequency at block 716 includes setting the frequency of the PFM signal to an initial value in a first setup of the optical system in the first scenario in which the object is absent, and the logic signal has the first value, as shown at block 724 of FIG. 7D. A value of the frequency is incremented or decremented from the initial value until an earlier of the value reaches a preset extremum value, or the logic signal changes from the first value to the second value, as shown at block 726. And thereafter, the value of the frequency is recorded as the first frequency, as shown at block 728.

In some examples, the preset extremum value is a preset maximum value, and the value of the frequency is incremented until the earlier of the value reaches the preset maximum value, or the logic signal changes from the first value to the second value.

In some examples, the preset extremum value is a preset minimum value, and the value of the frequency is decremented until the earlier of the value reaches the preset minimum value, or the logic signal changes from the first value to the second value.

Figure 7E:
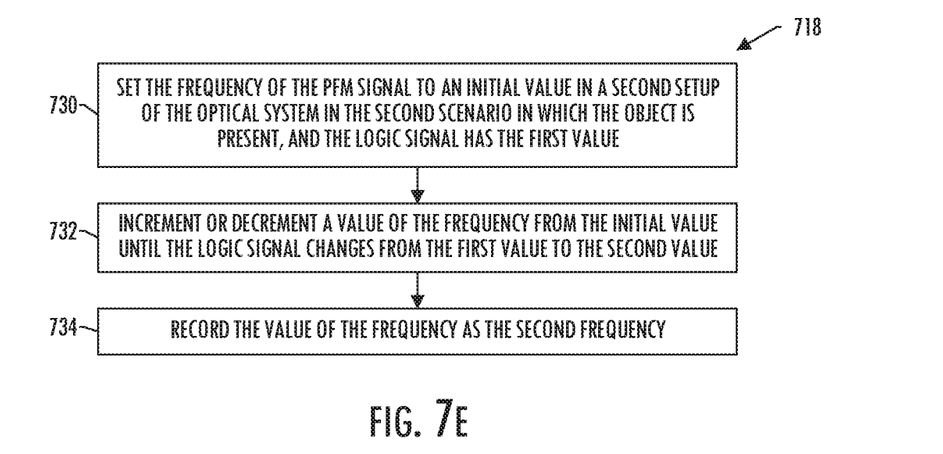

In some examples, determining the second frequency at block 718 includes setting the frequency of the PFM signal to an initial value in a second setup of the optical system in the second scenario in which the object is present, and the logic signal has the first value, as shown at block 730 of FIG. 7E. A value of the frequency is incremented or decremented from the initial value until the logic signal changes from the first value to the second value, as shown at block 732. And thereafter, the value of the frequency is recorded as the second frequency, as shown at block 734.

In some examples, the value of the frequency is incremented until the logic signal changes from the first value to the second value.

In some examples, the value of the frequency is decremented until the logic signal changes from the first value to the second value.

Figure 7F:
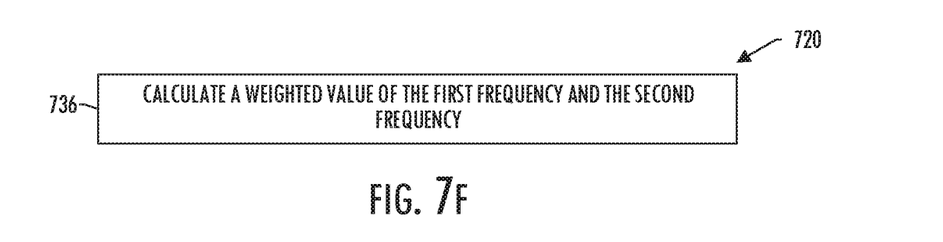

In some examples, calculating the frequency at block 720 includes calculating a weighted value of the first frequency and the second frequency, as shown at block 736 of FIG. 7F.

The processing circuitry 308 of example implementations of the present disclosure may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). In more particular examples, the processing circuitry may be embodied as or include a processor, coprocessor, controller, microprocessor, microcontroller, application specific integrated circuit (ASIC), field programmable gate array (FPGA) or the like.

As explained above and reiterated below, the present disclosure includes, without limitation, the following example implementations.

Clause 1. A tool storage system comprising: a cabinet; a drawer operably coupled to the cabinet; and an optical system configured to detect presence of an object in the drawer, the optical system comprising: a photoelectric sensor including a light transmitter configured to emit pulsed light, and a photoelectric receiver configured to receive a reflection of the pulsed light off of the object in proximity of the photoelectric sensor, and convert the reflection of the pulsed light to an electrical signal that indicates the proximity of the object and thereby the presence of the object in the drawer; and processing circuitry operably coupled to the photoelectric sensor, the processing circuitry configured to output a pulse-frequency modulation (PFM) signal from which the light transmitter is driven to emit the pulsed light, the PFM signal having a frequency that is adjustable to control an average intensity of the pulsed light, the frequency and thereby the average intensity of the pulsed light calibrated for a type of the object and an effective range of the photoelectric sensor.

Clause 2. The tool storage system of clause 1, wherein the optical system further comprises a driver circuit configured to receive the PFM signal, and switch the light transmitter on and off consistent with the PFM signal to thereby emit the pulsed light.

Clause 3. The tool storage system of clause 1 or clause 2, wherein the photoelectric sensor is an infrared (IR) photoelectric sensor, the light transmitter includes an IR transmitter, and the photoelectric receiver includes an IR receiver.

Clause 4. The tool storage system of any of clauses 1 to 3, wherein the light transmitter is a light emitting diode (LED).

Clause 5. The tool storage system of any of clauses 1 to 4, wherein the photoelectric receiver includes a phototransistor configured to cause the photoelectric receiver to produce the electrical signal as a logic signal that switches between a first value and a second value that indicate respectively absence and presence of the object in proximity of the photoelectric sensor.

Clause 6. The tool storage system of any of clauses 1 to 5, wherein calibration of the frequency of the PFM signal includes the processing circuitry configured to at least: determine a first frequency that represents a first extremum frequency for a first scenario in which the object is absent; determine a second frequency that represents a second extremum frequency for a second scenario in which the object is present; calculate the frequency of the PFM signal from the first frequency and the second frequency; and set the frequency of the PFM signal as calculated.

Clause 7. The tool storage system of clause 6, wherein the first extremum frequency is a maximum frequency for the first scenario, and wherein the second frequency is less than the first frequency, and represents the second extremum frequency that is a minimum frequency for the second scenario.

Clause 8. The tool storage system of clause 6 or clause 7, wherein the first extremum frequency is a minimum frequency for the first scenario, and wherein the second frequency is greater than the first frequency, and represents the second extremum frequency that is a maximum frequency for the second scenario.

Clause 9. The tool storage system of any of clauses 6 to 8, wherein the photoelectric receiver is configured to produce the electrical signal as a logic signal that switches between a first value and a second value that indicate respectively absence and presence of the object in proximity of the photoelectric sensor, and wherein the processing circuitry configured to determine the first frequency includes the processing circuitry configured to at least: set the frequency of the PFM signal to an initial value in a first setup of the optical system in the first scenario in which the object is absent, and the logic signal has the first value; increment or decrement a value of the frequency from the initial value until an earlier of the value reaches a preset extremum value, or the logic signal changes from the first value to the second value; and thereafter, record the value of the frequency as the first frequency.

Clause 10. The tool storage system of clause 9, wherein the preset extremum value is a preset maximum value, and wherein the processing circuitry is configured to increment the value of the frequency until the earlier of the value reaches the preset maximum value, or the logic signal changes from the first value to the second value.

Clause 11. The tool storage system of clause 9 or clause 10, wherein the preset extremum value is a preset minimum value, and wherein the processing circuitry is configured to decrement the value of the frequency until the earlier of the value reaches the preset minimum value, or the logic signal changes from the first value to the second value.

Clause 12. The tool storage system of any of clauses 6 to 11, wherein the processing circuitry configured to determine the second frequency includes the processing circuitry configured to at least: set the frequency of the PFM signal to an initial value in a second setup of the optical system in the second scenario in which the object is present, and the logic signal has the first value; increment or decrement a value of the frequency from the initial value until the logic signal changes from the first value to the second value; and thereafter, record the value of the frequency as the second frequency.

Clause 13. The tool storage system of clause 12, wherein the processing circuitry is configured to increment the value of the frequency until the logic signal changes from the first value to the second value.

Clause 14. The tool storage system of clause 12 or clause 13, wherein the processing circuitry is configured to decrement the value of the frequency until the logic signal changes from the first value to the second value.

Clause 15. The tool storage system of any of clauses 6 to 14, wherein the processing circuitry configured to calculate the frequency includes the processing circuitry configured to calculate a weighted value of the first frequency and the second frequency.

Clause 16. An optical system comprising: a photoelectric sensor including: a light transmitter configured to emit pulsed light; and a photoelectric receiver configured to receive a reflection of the pulsed light off of an object in proximity of the photoelectric sensor, and convert the reflection of the pulsed light to an electrical signal that indicates the proximity of the object; and processing circuitry operably coupled to the photoelectric sensor, the processing circuitry configured to output a pulse-frequency modulation (PFM) signal from which the light transmitter is driven to emit the pulsed light, the PFM signal having a frequency that is adjustable to control an average intensity of the pulsed light, the frequency and thereby the average intensity of the pulsed light calibrated for a type of the object and an effective range of the photoelectric sensor.

Clause 17. The optical system of clause 16, wherein the optical system further comprises a driver circuit configured to receive the PFM signal, and switch the light transmitter on and off consistent with the PFM signal to thereby emit the pulsed light.

Clause 18. The optical system of clause 17, wherein the driver circuit includes a transistor connected to the light transmitter as a low-side switch, the light transmitter connected to and between rail voltage and the transistor, and the transistor connected to and between the light transmitter and ground.

Clause 19. The optical system of clause 17 or clause 18, wherein the driver circuit includes a transistor connected to the light transmitter as a high-side switch, the transistor connected to and between rail voltage and the light transmitter, and the light transmitter connected to and between the transistor and ground.

Clause 20. The optical system of any of clauses 16 to 19, wherein the photoelectric sensor is an infrared (IR) photoelectric sensor, the light transmitter includes an IR transmitter, and the photoelectric receiver includes an IR receiver.

Clause 21. The optical system of any of clauses 16 to 20, wherein the light transmitter is a light emitting diode (LED).

Clause 22. The optical system of any of clauses 16 to 21, wherein the photoelectric receiver includes a phototransistor configured to cause the photoelectric receiver to produce the electrical signal as a logic signal that switches between a first value and a second value that indicate respectively absence and presence of the object in proximity of the photoelectric sensor.

Clause 23. The optical system of clause 22, wherein the phototransistor is connected in the optical system as a low-side switch that causes the photoelectric receiver to produce the electrical signal as a waveform that switches between a high voltage level and a low voltage level that represent respectively the first value and the second value.

Clause 24. The optical system of clause 23, wherein the photoelectric receiver includes an output to which the logic signal is provided, the output connected to and between rail voltage and the phototransistor, and the phototransistor connected to and between the output and ground.

Clause 25. The optical system of any of clauses 22 to 24, wherein the phototransistor is connected in the optical system as a high-side switch that causes the photoelectric receiver to produce the electrical signal as a waveform that switches between a high voltage level and a low voltage level that represent respectively the second value and the first value.

Clause 26. The optical system of clause 25, wherein the photoelectric receiver includes an output to which the logic signal is provided, the phototransistor connected to and between rail voltage and the output, and the output connected to and between the phototransistor and ground.

Clause 27. The optical system of any of clauses 16 to 26, wherein calibration of the frequency of the PFM signal includes the processing circuitry configured to at least: determine a first frequency that represents a first extremum frequency for a first scenario in which the object is absent; determine a second frequency that represents a second extremum frequency for a second scenario in which the object is present; calculate the frequency of the PFM signal from the first frequency and the second frequency; and set the frequency of the PFM signal as calculated.

Clause 28. The optical system of clause 27, wherein the first extremum frequency is a maximum frequency for the first scenario, and wherein the second frequency is less than the first frequency, and represents the second extremum frequency that is a minimum frequency for the second scenario.

Clause 29. The optical system of clause 27 or clause 28, wherein the first extremum frequency is a minimum frequency for the first scenario, and wherein the second frequency is greater than the first frequency, and represents the second extremum frequency that is a maximum frequency for the second scenario.

Clause 30. The optical system of any of clauses 27 to 29, wherein the photoelectric receiver is configured to produce the electrical signal as a logic signal that switches between a first value and a second value that indicate respectively absence and presence of the object in proximity of the photoelectric sensor, and wherein the processing circuitry configured to determine the first frequency includes the processing circuitry configured to at least: set the frequency of the PFM signal to an initial value in a first setup of the optical system in the first scenario in which the object is absent, and the logic signal has the first value; increment or decrement a value of the frequency from the initial value until an earlier of the value reaches a preset extremum value, or the logic signal changes from the first value to the second value; and thereafter, record the value of the frequency as the first frequency.

Clause 31. The optical system of clause 30, wherein the preset extremum value is a preset maximum value, and wherein the processing circuitry is configured to increment the value of the frequency until the earlier of the value reaches the preset maximum value, or the logic signal changes from the first value to the second value.

Clause 32. The optical system of clause 30 or clause 31, wherein the preset extremum value is a preset minimum value, and wherein the processing circuitry is configured to decrement the value of the frequency until the earlier of the value reaches the preset minimum value, or the logic signal changes from the first value to the second value.

Clause 33. The optical system of any of clauses 27 to 32, wherein the processing circuitry configured to determine the second frequency includes the processing circuitry configured to at least: set the frequency of the PFM signal to an initial value in a second setup of the optical system in the second scenario in which the object is present, and the logic signal has the first value; increment or decrement a value of the frequency from the initial value until the logic signal changes from the first value to the second value; and thereafter, record the value of the frequency as the second frequency.

Clause 34. The optical system of clause 33, wherein the processing circuitry is configured to increment the value of the frequency until the logic signal changes from the first value to the second value.

Clause 35. The optical system of clause 33 or clause 34, wherein the processing circuitry is configured to decrement the value of the frequency until the logic signal changes from the first value to the second value.

Clause 36. The optical system of any of clauses 27 to 35, wherein the processing circuitry configured to calculate the frequency includes the processing circuitry configured to calculate a weighted value of the first frequency and the second frequency.

Clause 37. A method of detecting an object in proximity of a photoelectric sensor that includes a light transmitter and a photoelectric receiver, the method comprising: emitting pulsed light from the light transmitter; receiving, at the photoelectric receiver, a reflection of the pulsed light off of the object in proximity of the photoelectric sensor; converting, at the photoelectric receiver, the reflection of the pulsed light to an electrical signal that indicates the proximity of the object; and outputting a pulse-frequency modulation (PFM) signal from which the light transmitter is driven to emit the pulsed light, the PFM signal having a frequency that is adjustable to control an average intensity of the pulsed light, the frequency and thereby the average intensity of the pulsed light calibrated for a type of the object and an effective range of the photoelectric sensor.

Clause 38. The method of clause 37, wherein the method further comprises a driver circuit receiving the PFM signal, and switching the light transmitter on and off consistent with the PFM signal to thereby emit the pulsed light.

Clause 39. The method of clause 38, wherein the driver circuit includes a transistor that switches the light transmitter as a low-side switch, the light transmitter connected to and between rail voltage and the transistor, and the transistor connected to and between the light transmitter and ground.

Clause 40. The method of clause 38 or clause 39, wherein the driver circuit includes a transistor that switches the light transmitter as a high-side switch, the transistor connected to and between rail voltage and the light transmitter, and the light transmitter connected to and between the transistor and ground.

Clause 41. The method of any of clauses 37 to 40, wherein the photoelectric receiver includes a phototransistor that causes the photoelectric receiver to produce the electrical signal as a logic signal that switches between a first value and a second value that indicate respectively absence and presence of the object in proximity of the photoelectric sensor.

Clause 42. The method of clause 41, wherein the phototransistor is connected in the optical system as a low-side switch that causes the photoelectric receiver to produce the electrical signal as a waveform that switches between a high voltage level and a low voltage level that represent respectively the first value and the second value.

Clause 43. The method of clause 42, wherein the photoelectric receiver includes an output to which the logic signal is provided, the output connected to and between rail voltage and the phototransistor, and the phototransistor connected to and between the output and ground.

Clause 44. The method of any of clauses 41 to 43, wherein the phototransistor is connected in the optical system as a high-side switch that causes the photoelectric receiver to produce the electrical signal as a waveform that switches between a high voltage level and a low voltage level that represent respectively the second value and the first value.

Clause 45. The method of clause 44, wherein the photoelectric receiver includes an output to which the logic signal is provided, the phototransistor connected to and between rail voltage and the output, and the output connected to and between the phototransistor and ground Clause 46. The method of any of clauses 37 to 45, wherein the method further comprises calibrating the frequency of the PFM signal, including at least: determining a first frequency that represents a first extremum frequency for a first scenario in which the object is absent; determining a second frequency that represents a second extremum frequency for a second scenario in which the object is present; calculating the frequency of the PFM signal from the first frequency and the second frequency; and setting the frequency of the PFM signal as calculated.

Clause 47. The method of clause 46, wherein the first extremum frequency is a maximum frequency for the first scenario, and wherein the second frequency is less than the first frequency, and represents the second extremum frequency that is a minimum frequency for the second scenario.

Clause 48. The method of clause 46 or clause 47, wherein the first extremum frequency is a minimum frequency for the first scenario, and wherein the second frequency is greater than the first frequency, and represents the second extremum frequency that is a maximum frequency for the second scenario.

Clause 49. The method of any of clauses 46 to 48, wherein the photoelectric receiver is configured to produce the electrical signal as a logic signal that switches between a first value and a second value that indicate respectively absence and presence of the object in proximity of the photoelectric sensor, and wherein determining the first frequency includes at least: setting the frequency of the PFM signal to an initial value in a first setup of the optical system in the first scenario in which the object is absent, and the logic signal has the first value; incrementing or decrementing a value of the frequency from the initial value until an earlier of the value reaches a preset extremum value, or the logic signal changes from the first value to the second value; and thereafter, recording the value of the frequency as the first frequency.

Clause 50. The method of clause 99, wherein the preset extremum value is a preset maximum value, and wherein the value of the frequency is incremented until the earlier of the value reaches the preset maximum value, or the logic signal changes from the first value to the second value.

Clause 51. The tool storage system of clause 49 or clause 50, wherein the preset extremum value is a preset minimum value, and wherein the value of the frequency is decremented until the earlier of the value reaches the preset minimum value, or the logic signal changes from the first value to the second value.

Clause 52. The method of any of clauses 46 to 51, wherein determining the second frequency includes at least: setting the frequency of the PFM signal to an initial value in a second setup of the optical system in the second scenario in which the object is present, and the logic signal has the first value; incrementing or decrementing a value of the frequency from the initial value until the logic signal changes from the first value to the second value; and thereafter, recording the value of the frequency as the second frequency.

Clause 53. The tool storage system of clause 52, wherein the value of the frequency is incremented until the logic signal changes from the first value to the second value.

Clause 54. The tool storage system of clause 52 or clause 53, wherein the value of the frequency is decremented until the logic signal changes from the first value to the second value.

Clause 55. The method of any of clauses 46 to 54, wherein calculating the frequency includes calculating a weighted value of the first frequency and the second frequency.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A tool storage system comprising:
   a cabinet;
   a drawer operably coupled to the cabinet; and
   an optical system configured to detect presence of an object in the drawer, the optical system comprising:
      a photoelectric sensor including a light transmitter configured to emit pulsed light, and a photoelectric receiver configured to receive a reflection of the pulsed light off of the object in proximity of the photoelectric sensor, and convert the reflection of the pulsed light to an electrical signal that indicates the proximity of the object and thereby the presence of the object in the drawer; and
      processing circuitry operably coupled to the photoelectric sensor, the processing circuitry configured to output a pulse-frequency modulation (PFM) signal from which the light transmitter is driven to emit the pulsed light, the PFM signal having a frequency that is adjustable to control an average intensity of the pulsed light, the frequency and thereby the average intensity of the pulsed light calibrated for a type of the object and an effective range of the photoelectric sensor.

2. The tool storage system of claim 1, wherein calibration of the frequency of the PFM signal includes the processing circuitry configured to at least:
   determine a first frequency that represents a first extremum frequency for a first scenario in which the object is absent;
   determine a second frequency that represents a second extremum frequency for a second scenario in which the object is present;
   calculate the frequency of the PFM signal from the first frequency and the second frequency; and
   set the frequency of the PFM signal as calculated.

3. The tool storage system of claim 2, wherein the photoelectric receiver is configured to produce the electrical signal as a logic signal that switches between a first value and a second value that indicate respectively absence and presence of the object in proximity of the photoelectric sensor, and
   wherein the processing circuitry configured to determine the first frequency includes the processing circuitry configured to at least:
      set the frequency of the PFM signal to an initial value in a first setup of the optical system in the first scenario in which the object is absent, and the logic signal has the first value;
      increment or decrement a value of the frequency from the initial value until an earlier of the value reaches a preset extremum value, or the logic signal changes from the first value to the second value; and thereafter,
      record the value of the frequency as the first frequency.

4. The tool storage system of claim 2, wherein the processing circuitry configured to determine the second frequency includes the processing circuitry configured to at least:
   set the frequency of the PFM signal to an initial value in a second setup of the optical system in the second scenario in which the object is present, and the logic signal has the first value;
   increment or decrement a value of the frequency from the initial value until the logic signal changes from the first value to the second value; and thereafter,
   record the value of the frequency as the second frequency.

5. The tool storage system of claim 2, wherein the processing circuitry configured to calculate the frequency includes the processing circuitry configured to calculate a weighted value of the first frequency and the second frequency.

6. An optical system comprising:
   a photoelectric sensor including:
      a light transmitter configured to emit pulsed light; and
      a photoelectric receiver configured to receive a reflection of the pulsed light off of an object in proximity of the photoelectric sensor, and convert the reflection of the pulsed light to an electrical signal that indicates the proximity of the object; and
   processing circuitry operably coupled to the photoelectric sensor, the processing circuitry configured to output a pulse-frequency modulation (PFM) signal from which the light transmitter is driven to emit the pulsed light, the PFM signal having a frequency that is adjustable to control an average intensity of the pulsed light, the frequency and thereby the average intensity of the pulsed light calibrated for a type of the object and an effective range of the photoelectric sensor.

7. The optical system of claim 6, wherein the optical system further comprises a driver circuit configured to receive the PFM signal, and switch the light transmitter on and off consistent with the PFM signal to thereby emit the pulsed light.

8. The optical system of claim 6, wherein the photoelectric sensor is an infrared (IR) photoelectric sensor, the light transmitter includes an IR transmitter, and the photoelectric receiver includes an IR receiver.

9. The optical system of claim 6, wherein the light transmitter is a light emitting diode (LED).

10. The optical system of claim 6, wherein the photoelectric receiver includes a phototransistor configured to cause the photoelectric receiver to produce the electrical signal as a logic signal that switches between a first value and a second value that indicate respectively absence and presence of the object in proximity of the photoelectric sensor.

11. The optical system of claim 6, wherein calibration of the frequency of the PFM signal includes the processing circuitry configured to at least:
determine a first frequency that represents a first extremum frequency for a first scenario in which the object is absent;
determine a second frequency that represents a second extremum frequency for a second scenario in which the object is present;
calculate the frequency of the PFM signal from the first frequency and the second frequency; and
set the frequency of the PFM signal as calculated.

12. The optical system of claim 11, wherein the photoelectric receiver is configured to produce the electrical signal as a logic signal that switches between a first value and a second value that indicate respectively absence and presence of the object in proximity of the photoelectric sensor, and
wherein the processing circuitry configured to determine the first frequency includes the processing circuitry configured to at least:
set the frequency of the PFM signal to an initial value in a first setup of the optical system in the first scenario in which the object is absent, and the logic signal has the first value;
increment or decrement a value of the frequency from the initial value until an earlier of the value reaches a preset extremum value, or the logic signal changes from the first value to the second value; and thereafter,
record the value of the frequency as the first frequency.

13. The optical system of claim 11, wherein the processing circuitry configured to determine the second frequency includes the processing circuitry configured to at least:
set the frequency of the PFM signal to an initial value in a second setup of the optical system in the second scenario in which the object is present, and the logic signal has the first value;
increment or decrement a value of the frequency from the initial value until the logic signal changes from the first value to the second value; and thereafter,
record the value of the frequency as the second frequency.

14. The optical system of claim 11, wherein the processing circuitry configured to calculate the frequency includes the processing circuitry configured to calculate a weighted value of the first frequency and the second frequency.

15. A method of detecting an object in proximity of a photoelectric sensor that includes a light transmitter and a photoelectric receiver, the method comprising:
emitting pulsed light from the light transmitter;
receiving, at the photoelectric receiver, a reflection of the pulsed light off of the object in proximity of the photoelectric sensor;
converting, at the photoelectric receiver, the reflection of the pulsed light to an electrical signal that indicates the proximity of the object; and
outputting a pulse-frequency modulation (PFM) signal from which the light transmitter is driven to emit the pulsed light, the PFM signal having a frequency that is adjustable to control an average intensity of the pulsed light, the frequency and thereby the average intensity of the pulsed light calibrated for a type of the object and an effective range of the photoelectric sensor.

16. The method of claim 15, wherein the method further comprises a driver circuit receiving the PFM signal, and switching the light transmitter on and off consistent with the PFM signal to thereby emit the pulsed light.

17. The method of claim 15, wherein the method further comprises calibrating the frequency of the PFM signal, including at least:
determining a first frequency that represents a first extremum frequency for a first scenario in which the object is absent;
determining a second frequency that represents a second extremum frequency for a second scenario in which the object is present;
calculating the frequency of the PFM signal from the first frequency and the second frequency; and
setting the frequency of the PFM signal as calculated.

18. The method of claim 17, wherein the photoelectric receiver is configured to produce the electrical signal as a logic signal that switches between a first value and a second value that indicate respectively absence and presence of the object in proximity of the photoelectric sensor, and
wherein determining the first frequency includes at least:
setting the frequency of the PFM signal to an initial value in a first setup of the optical system in the first scenario in which the object is absent, and the logic signal has the first value;
incrementing or decrementing a value of the frequency from the initial value until an earlier of the value reaches a preset extremum value, or the logic signal changes from the first value to the second value; and thereafter,
recording the value of the frequency as the first frequency.

19. The method of claim 17, wherein determining the second frequency includes at least:
setting the frequency of the PFM signal to an initial value in a second setup of the optical system in the second scenario in which the object is present, and the logic signal has the first value;
incrementing or decrementing a value of the frequency from the initial value until the logic signal changes from the first value to the second value; and thereafter,
recording the value of the frequency as the second frequency.

20. The method of claim 17, wherein calculating the frequency includes calculating a weighted value of the first frequency and the second frequency.

\* \* \* \* \*